United States Patent
Kaga et al.

(10) Patent No.: US 8,433,922 B2
(45) Date of Patent: Apr. 30, 2013

(54) SYSTEM AND METHOD OF BIOMETRIC AUTHENTICATION USING MULTIPLE KINDS OF TEMPLATES

(75) Inventors: Yosuke Kaga, Yokohama (JP); Osamu Takata, Sagamihara (JP); Yoshiaki Isobe, Yokohama (JP); Kenta Takahashi, Kamakura (JP); Takao Murakami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 12/873,729

(22) Filed: Sep. 1, 2010

(65) Prior Publication Data
US 2011/0138187 A1 Jun. 9, 2011

(30) Foreign Application Priority Data
Dec. 8, 2009 (JP) .................................. 2009-278301

(51) Int. Cl.
G06F 21/00 (2006.01)
G06K 9/00 (2006.01)

(52) U.S. Cl.
USPC .......................................... 713/186; 382/115

(58) Field of Classification Search .................. None
See application file for complete search history.

(56) References Cited

U.S. PATENT DOCUMENTS

| 7,362,884 | B2 * | 4/2008 | Willis et al. .................... 382/116 |
| 7,606,396 | B2 * | 10/2009 | Miller et al. ................... 382/116 |
| 2002/0184538 | A1 | 12/2002 | Sugimura et al. |
| 2003/0031348 | A1 * | 2/2003 | Kuepper et al. ............... 382/116 |
| 2005/0229007 | A1 | 10/2005 | Bolle et al. |

FOREIGN PATENT DOCUMENTS

| JP | 2003-050783 A | 2/2003 |
| JP | 2008-310743 A | 12/2008 |

* cited by examiner

*Primary Examiner* — Philip Chea
*Assistant Examiner* — Fatoumata Traore
(74) *Attorney, Agent, or Firm* — Volpe and Koenig, P.C.

(57) ABSTRACT

In additional enrollment of a template in a biometric authentication system, the template is automatically enrolled on the basis of a plurality of authentication results to assure a user's convenience and security. A post-migration authentication server receives a first template and a second template from a post-migration authentication terminal, performs authentication on the basis of the comparison result between the received first template and the user's preliminarily first enrolled template, and provisionally enrolls the first template and the second template. It repeats the reception, authentication, and provisional enrollment and calculates a match probability from a plurality of comparison results of the provisionally first enrolled templates, determines whether or not to store a second enrolled template on the basis of the match probability, and automatically enrolls the second template in the post-migration authentication server.

11 Claims, 10 Drawing Sheets

SYSTEM AND METHOD OF BIOMETRIC AUTHENTICATION USING MULTIPLE KINDS OF TEMPLATES

CLAIM OF PRIORITY

The present application claims priority from Japanese application JP2009-278301 filed on Dec. 8, 2009, the content of which is hereby incorporated by reference into this application.

BACKGROUND

This invention relates to biometric authentication technology, and, in particular, relates to a technique for enrolling templates in a system performing biometric authentication using multiple kinds of templates.

Biometric authentication systems authenticate individuals on the basis of their biometric information, usually, such as fingerprints, veins, irises, faces, and the like. A biometric authentication system preliminarily obtains and stores a user's biometric information, and performs individual authentication by determining whether the user's biometric information obtained in the authentication process is the same person's biometric information which has preliminarily been stored. There are generally two types of biometric authentication systems: the stand alone type that obtains, stores, and verifies biometric information in a single apparatus and the network authentication type which is comprised of a terminal for obtaining biometric information and a server for storing and verifying the biometric information.

In the network authentication type of biometric authentication system, a terminal for preliminarily enrolling biometric information (hereinafter, referred to as a enroll terminal) obtains a user's biometric information and creates a feature value (hereinafter, referred to as a template) to be used in comparison from the obtained biometric information, and a server for performing authentication (hereinafter, referred to as an authentication server) enrolls the created template. When performing biometric authentication, a terminal including a biometric information input module and an authentication result display module (hereinafter, referred to as an authentication terminal) obtains a user's biometric information and transmits a template created from the obtained biometric information to the authentication server. The authentication server compares the received template with the preliminarily enrolled template, determines whether the user is the person identical to the enrolled user, and transmits the determination result to the authentication terminal.

Such a biometric authentication system requires preliminary enrollment of all templates to be used in authentication. To use multiple kinds of templates in authentication, it is necessary that the multiple kinds of templates be created from biometric information and be enrolled preliminarily.

Japanese patent application laid-open No. 2003-050783 (Document 1) discloses a combined authentication system using multiple kinds of biometric information. The combined authentication system preliminarily enrolls all kinds of templates to be used in authentication in an authentication server. Afterwards, a user inputs the multiple kinds of biometric information to an authentication terminal to be authenticated.

Japanese patent application laid-open No. 2008-310743 (Document 2) discloses a combined authentication system using faces and fingerprints. The combined authentication system obtains facial data and fingerprint data from a user and authenticates the user with the preliminarily enrolled facial data and fingerprint data. If the authentication is successful, the combined authentication system automatically updates the facial data to use it in the future authentication.

SUMMARY

There are two modes of biometric authentication systems: the unimodal authentication system that performs authentication using a single kind of biometric information and the multimodal authentication system that performs authentication using multiple kinds of biometric information. A unimodal authentication system employing server authentication preliminarily enrolls templates created from a single kind of biometric information in an authentication server. In its biometric authentication, an authentication terminal obtains biometric information of a user and compares the template created from the obtained biometric information with a preliminarily enrolled template in the authentication server to perform authentication. To migrate from the unimodal authentication system into the multimodal authentication system, a single or multiple kinds of templates to be newly added (hereinafter, referred to as second templates) are required to be enrolled in addition to the single or the multiple kinds of templates which have already been enrolled (hereinafter, referred to as first templates).

In the meanwhile, there is a unimodal authentication system that creates multiple kinds of templates from the same biometric information and performs authentication using the multiple kinds of templates together. To migrate from a unimodal authentication system that performs authentication using first templates into such a unimodal authentication system that performs authentication using the first templates and second templates together, the second templates are required to be additionally enrolled.

The combined authentication system disclosed in Document 1 requires users to newly enroll second templates to migrate from a biometric authentication system only with first templates enrolled into a biometric authentication system using the first and the second templates. Consequently, the convenience in the combined authentication system is disadvantageously reduced.

The combined authentication system disclosed in Document 2 has a function that automatically enrolls a second template (facial data) at a user's authentication operation. Therefore, no special enrollment operation is necessary for the user to enroll the second template in the biometric authentication system with a first template (fingerprint data) enrolled. However, since the combined authentication system automatically enrolls the second template on the basis of the comparison result of the first template and the second template which have been obtained in a single authentication operation, the risk that any other person's template may be erroneously enrolled as the user's second template depends on the accuracy on a single biometric authentication process. Accordingly, if the single biometric authentication process is not accurate enough, there is a risk that any other person's second template might be additionally enrolled in error.

This specification discloses a biometric authentication system that assures convenience in enrolling templates. Furthermore, it discloses a biometric authentication system that reduces the risk of automatically enrolling any other person's template in error.

A typical example disclosed is a biometric authentication system comprising an input device for obtaining users' biometric information, a processor coupled to the input device, and a storage device for storing data. The biometric authentication system stores a feature value of first biometric information obtained from a first user as a first enrolled template related to the first user, obtains a plurality of pairs of first biometric information and second biometric information through the input device, calculates feature values of the first biometric information and the second biometric information as first templates and as second templates, respectively, determines whether authentication of the first user is successful or not on the basis of the similarity between each of the first templates and the first enrolled template, calculates a match probability indicating the probability that a plurality of first templates determined that the similarity to the first enrolled template exceeds a predetermined threshold value are the feature values of the biometric information obtained from the first user, stores one of the plurality of second templates related to the plurality of first templates determined that the similarity to the first enrolled template exceeds the predetermined threshold value as a second enrolled template related to the first user if the match probability exceeds a predetermined threshold value, calculates a feature value of second biometric information as the second template if the biometric authentication system obtains at least the second biometric information through the input device after storing the second enrolled template, and determines whether authentication of the first user is successful or not on the basis of the similarity between the second template and the second enrolled template.

According to the disclosure, a highly convenient biometric authentication system is provided with respect to enrolling templates.

Moreover, according to the disclosure, a risk of erroneously enrolling any other person's template can be reduced.

DETAILED DESCRIPTION OF THE EMBODIMENTS

First Embodiment

A first embodiment is a system that, when migrating from a unimodal authentication system that performs authentication using a single kind of templates into a multimodal authentication system that performs authentication using multiple kinds of templates, automatically enrolls new templates to be added (hereinafter, referred to as second templates) to templates which have already been enrolled in the unimodal authentication system (hereinafter, referred to as first templates). According to this embodiment, initially, first-template enrollment illustrated in FIG. 6 and unimodal authentication illustrated in FIG. 7 are performed in the pre-migration unimodal authentication system shown in FIG. 1. To migrate from a unimodal authentication system to a multimodal authentication system, a transition period is provided in which users are allowed to enroll second templates. During the transition period, automatic enrollment of second templates and authentication using first templates are performed in accordance with the procedure illustrated in FIG. 8 in the post-migration multimodal authentication system shown in FIG. 2. After the transition period has passed and the users' second templates have been enrolled, multimodal authentication illustrated in FIG. 9 is performed.

Hereinafter, the first embodiment will be described in detail with reference to the accompanying drawings.

Figure 1:
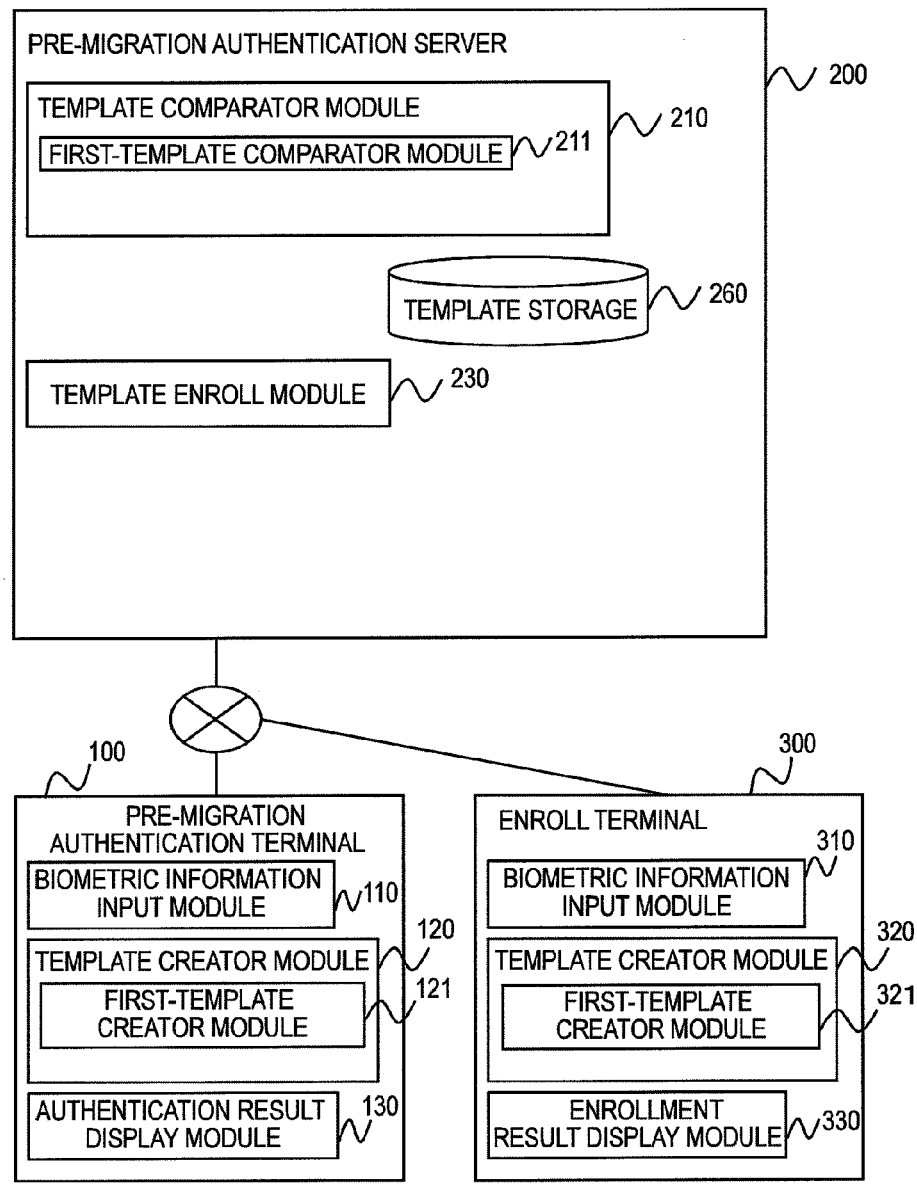
FIG. 1 is a block diagram illustrating a configuration example of a pre-migration biometric authentication system in a first embodiment.

FIG. 1 is a block diagram illustrating a configuration example of a pre-migration biometric authentication system according to the first embodiment.

The pre-migration biometric authentication system is a unimodal authentication system that performs authentication on the basis of a single kind of biometric information and comprises a pre-migration authentication terminal 100, a pre-migration authentication server 200, and a enroll terminal 300.

The pre-migration authentication terminal 100 comprises a biometric information input module 110 for obtaining a user's biometric information corresponding to a first template (hereinafter, referred to as first biometric information), a template creator module 120 for creating a template from the biometric information obtained by the biometric information input module 110, and an authentication result display module 130 for showing the user the result of authentication. The biometric information input module 110 obtains one kind of first biometric information. The kind of the first biometric information may be, for example, fingerprint, veins, iris, face, or the like. The template creator module 120 includes a first-template creator module 121. The first-template creator module 121 creates a first template to be used for comparison from the first biometric information. The authentication result display module 130 shows the user the authentication result received from the pre-migration authentication server 200.

The pre-migration authentication server 200 comprises a template comparator module 210 for comparing templates and obtaining the similarity between the templates, a template enroll module 230 for enrolling the template created by the template creator module 120 in a template storage 260, and the template storage 260 for storing enrolled templates. The template comparator module 210 includes a first-template comparator module 211 for comparing first templates.

The enroll terminal 300 comprises a biometric information input module 310 for obtaining the first biometric information of a enrollee (namely, a user who is going to enroll his or her biometric information), a template creator module 320 for creating a template from the biometric information obtained by the biometric information input module 310, and a enrollment result display module 330 for showing the enrollee the result of the template enrollment. The template creator module 320 includes a first-template creator module 321 for creating a first template from the first biometric information obtained by the biometric information input module 310.

Figure 2:
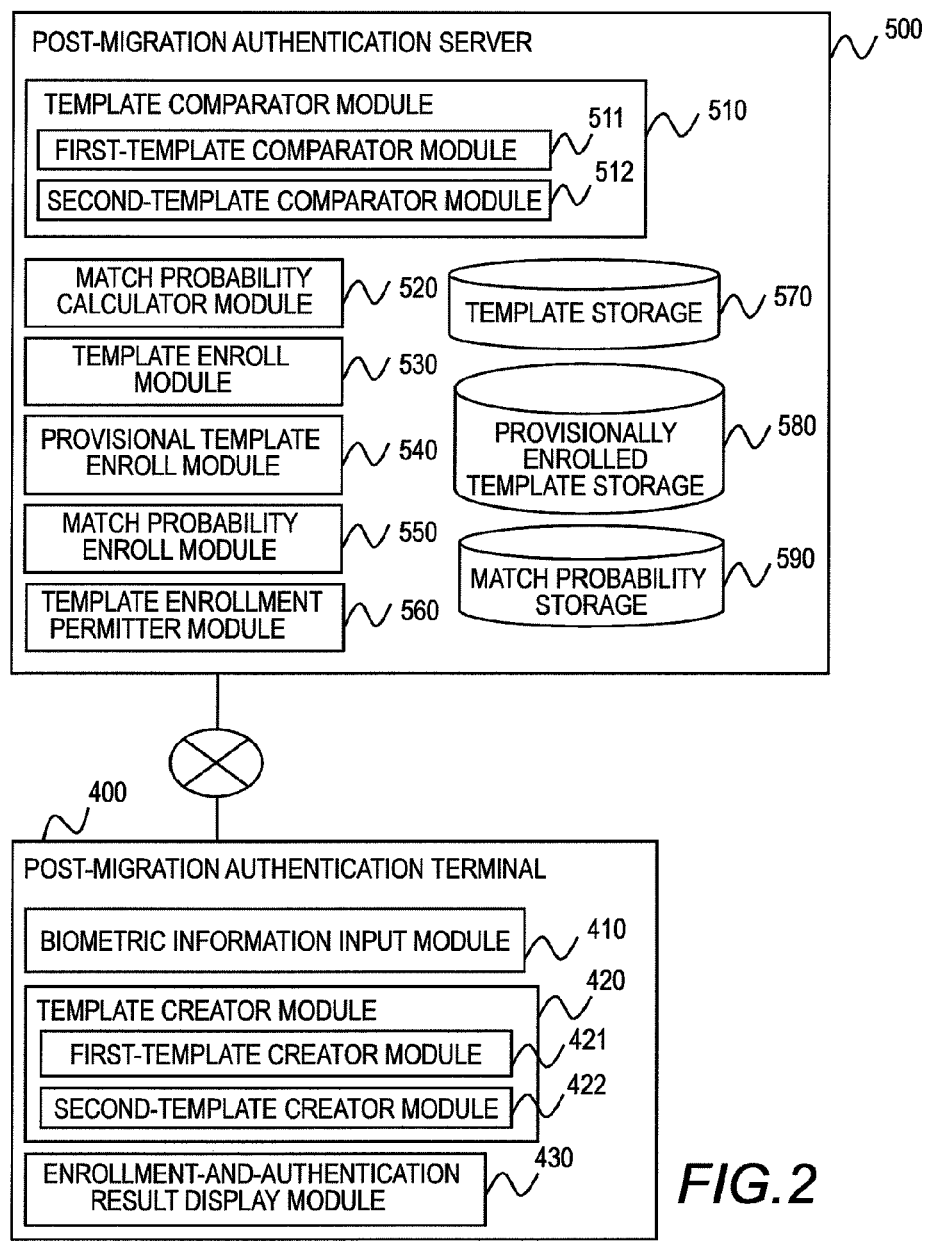
FIG. 2 is a block diagram illustrating a configuration example of a post-migration biometric authentication system in the first embodiment.

FIG. 2 is a block diagram illustrating a configuration example of a post-migration biometric authentication system according to the first embodiment.

The post-migration biometric authentication system can automatically enroll a second template when migrating from the biometric authentication system shown in FIG. 1 that performs authentication using first templates to the biometric authentication system that performs authentication using first and second templates together. The post-migration biometric authentication system comprises a post-migration authentication terminal 400 and a post-migration authentication server 500.

The post-migration authentication terminal 400 comprises a biometric information input module 410 for obtaining first biometric information and biometric information corresponding to a second template (hereinafter, referred to as second biometric information) from a user, a template creator module 420 for creating a first template and a second template from the first biometric information and the second biometric information, respectively, which are obtained by the biometric information input module 410, and a enrollment-and-authentication result display module 430 for showing the user the result of enrollment and authentication.

The biometric information input module 410 obtains first biometric information and second biometric information of different kinds. The kinds of the biometric information include, for example, fingerprints, veins, irises, and faces. For example, the first biometric information may be a fingerprint and the second biometric information may be the vein pattern of the finger. The template creator module 420 includes a first-template creator module 421 and a second-template creator module 422. The first biometric information and the second biometric information obtained by the biometric information input module 410 are input to the first-template creator module 421 and the second-template creator module 422, and a first template and a second template are created based on the information, respectively. The enrollment-and-authentication result display module 430 displays the result of the transmission of the first and the second templates to the post-migration authentication server 500 and the result of the enrollment and authentication received from the post-migration authentication server 500.

The post-migration authentication server 500 comprises a template comparator module 510 for obtaining the similarity between templates by comparing the templates, a match probability calculator module 520 for calculating a match probability on the basis of the similarity obtained by the template comparator module 510, a template enrollment permitter module 560 for determining whether to enroll the template or not, a template enroll module 530 for enrolling the template created by the template creator module 420, a provisional template enroll module 540 for enrolling the template created by the template creator module 420 as a provisionally enrolled template, a match probability enroll module 550 for enrolling the match probability calculated by the match probability calculator module 520, a template storage 570 for storing the templates enrolled by the template enroll module 530, a provisionally enrolled template storage 580 for storing the provisionally enrolled templates enrolled by the provisional template enroll module 540, and a match probability storage 590 for storing the match probabilities enrolled by the match probability enroll module 550.

Figure 3:
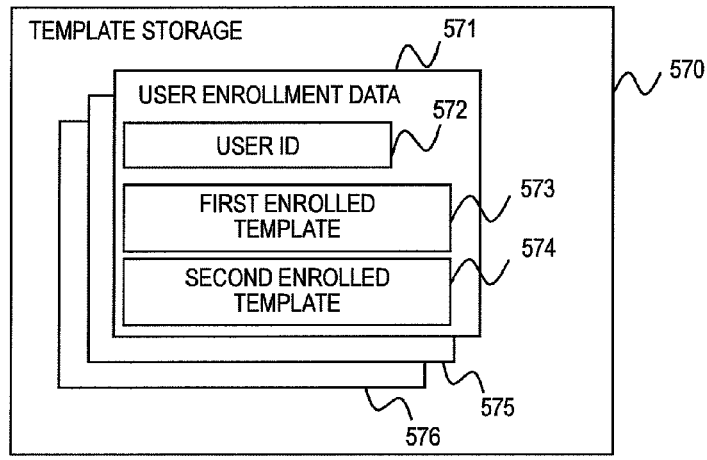
FIG. 3 is an explanatory diagram exemplifying an internal configuration of a template storage in the first embodiment.

FIG. 3 is an explanatory diagram illustrating an internal configuration of the template storage 570 in the first embodiment.

The template storage 570 includes user enrollment data 571, 575, 576, and others. Each of the user enrollment data 571, 575, 576, and others contains each user's templates. FIG. 3 exemplifies three user enrollment data 571, 575, and 576 for three users; in practice, the template storage 570 includes any number of user enrollment data for any number of users. Hereinbelow, the user enrollment data 571 will be explained. Since the user enrollment data 575 and 576 are similar to the user enrollment data 571, the explanations thereon will be omitted.

The user enrollment data 571 may include a user ID 572, a enrolled first template 573, and a enrolled second template 574. The user ID 572 may include an identifier for uniquely identifying the user; the identifier may be expressed in, for example, the combination of numeric and alphabetic characters. The enrolled first template 573 may include a first template created by the first-template creator module 421 and the enrolled second template 574 may include a second template created by the second-template creator module 422. The template enroll module 530 enrolls the user enrollment data 571 including the enrolled first template 573 and the enrolled second template 574 related to the user ID 572.

Figure 4:
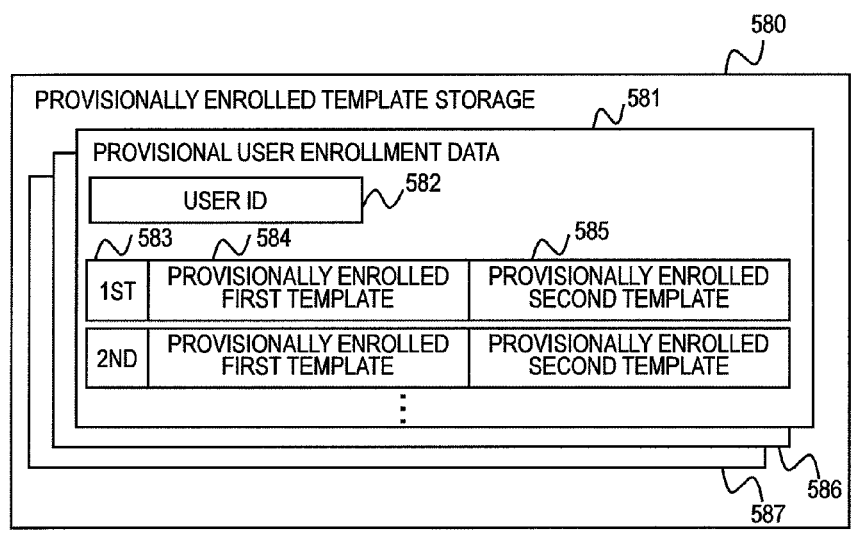
FIG. 4 is an explanatory diagram exemplifying an internal configuration of a provisionally enrolled template storage in the first embodiment.

FIG. 4 is an explanatory diagram illustrating an internal configuration of the provisionally enrolled template storage 580.

The provisionally enrolled template storage 580 includes provisional user enrollment data 581, 586, 587, and others. Each of the provisional user enrollment data 581, 586, 587, and others contains each user's provisionally enrolled templates. FIG. 4 exemplifies three provisional user enrollment data 581, 586, and 587 for three users; in practice, the provisionally enrolled template storage includes any number of provisional user enrollment data for any number of users. Hereinbelow, the provisional user enrollment data 581 will be explained. Since the provisional user enrollment data 586 and 587 are similar to the provisional user enrollment data 581, the explanations thereon will be omitted.

The provisional user enrollment data 581 may include a user ID 582, authentication numbers 583, provisionally enrolled first templates 584, and provisionally enrolled second templates 585. The user ID 582 may include an identifier for uniquely identifying the user; the identifier may be expressed in, for example, the combination of numeric and alphabetic characters. The provisionally enrolled first templates 584 and the provisionally enrolled second templates 585 may include first templates created by the first-template creator module 421 and second templates created by the second-template creator module 422, respectively.

Figure 5:
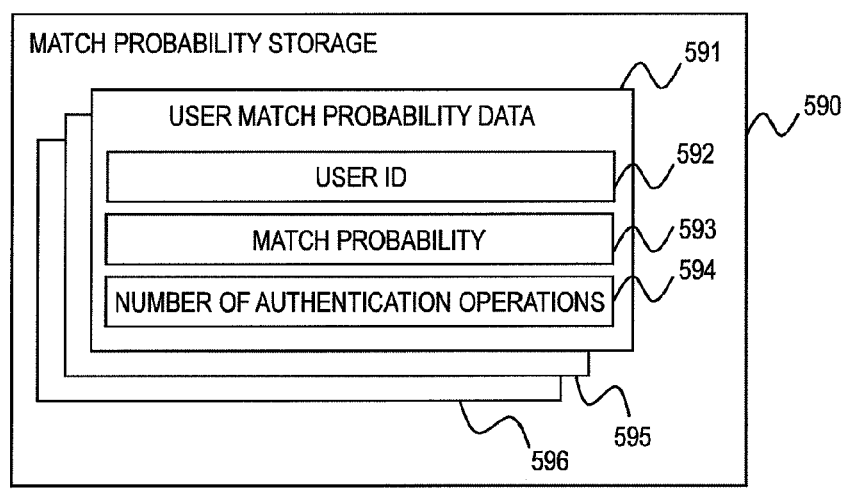
FIG. 5 is an explanatory diagram exemplifying an internal configuration of a match probability storage in the first embodiment.

FIG. 5 is an explanatory diagram illustrating an internal configuration of the match probability storage 590 in the first embodiment.

The match probability storage 590 includes user match probability data 591, 595, 596, and others. Each of the user match probability data 591, 595, and 596 contains a match probability of each user. The match probability of a user is the probability that the obtained template is the feature value of the user's biometric information. FIG. 5 exemplifies three user match probability data 591, 595, and 596 for three users; in practice, the match probability storage 590 stores any number of user match probability data for any number of users. Hereinbelow, the user match probability data 591 will be explained. Since the user match probability data 595 and 596 are similar to the user match probability data 591, the explanations thereon will be omitted.

The user match probability data 591 may include a user ID 592, a match probability 593, and the number of authentication operations 594. The user ID 592 may be an identifier for uniquely identifying the user and may be expressed in, for example, the combination of numeric and alphabetic characters. The match probability 593 may include a probability value which is calculated by the match probability calculator 520. The probability value is, for example, any value from 0 to 1.

Figure 6:
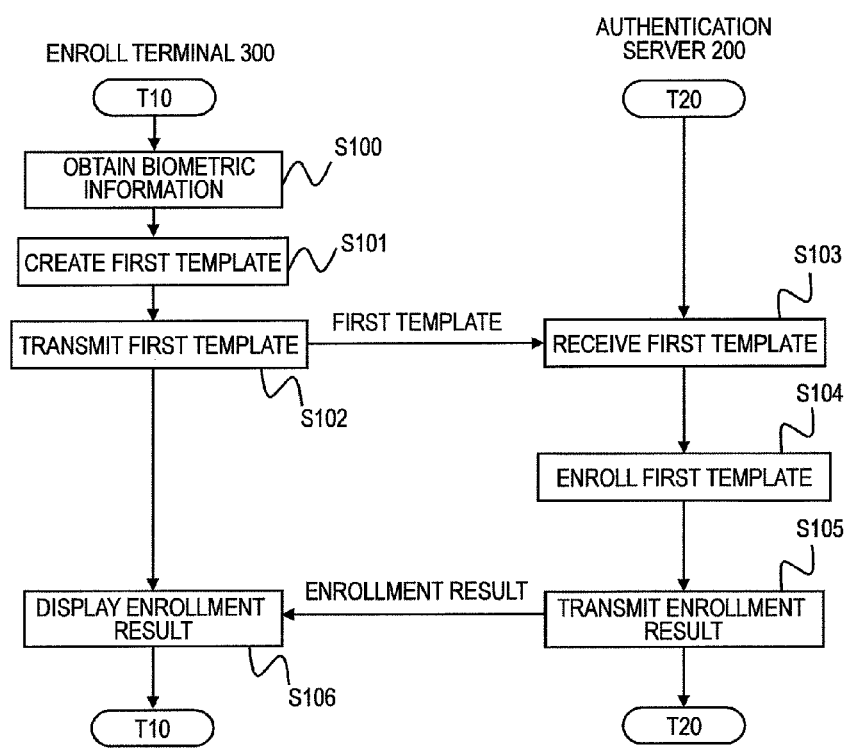
FIG. 6 is a flowchart exemplifying a procedure of enrollment of a first template in the first embodiment.
Figure 7:
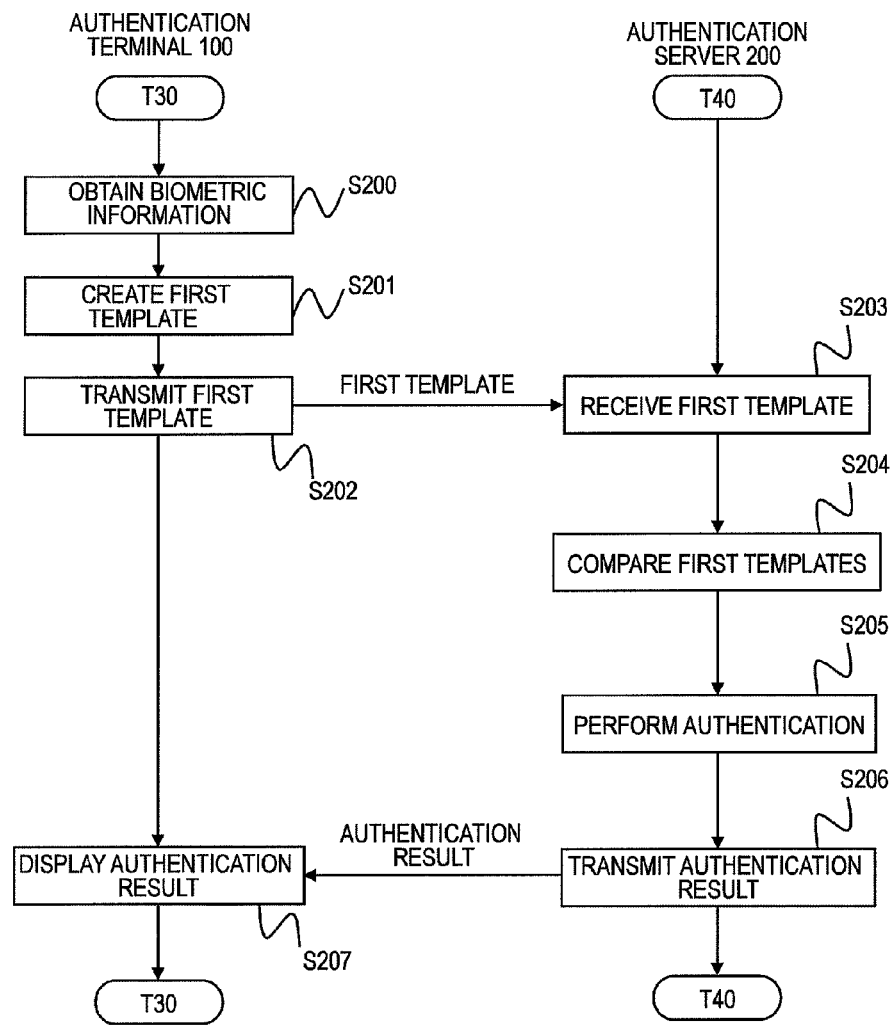
FIG. 7 is a flowchart exemplifying a procedure of unimodal authentication in the first embodiment.
Figure 8:
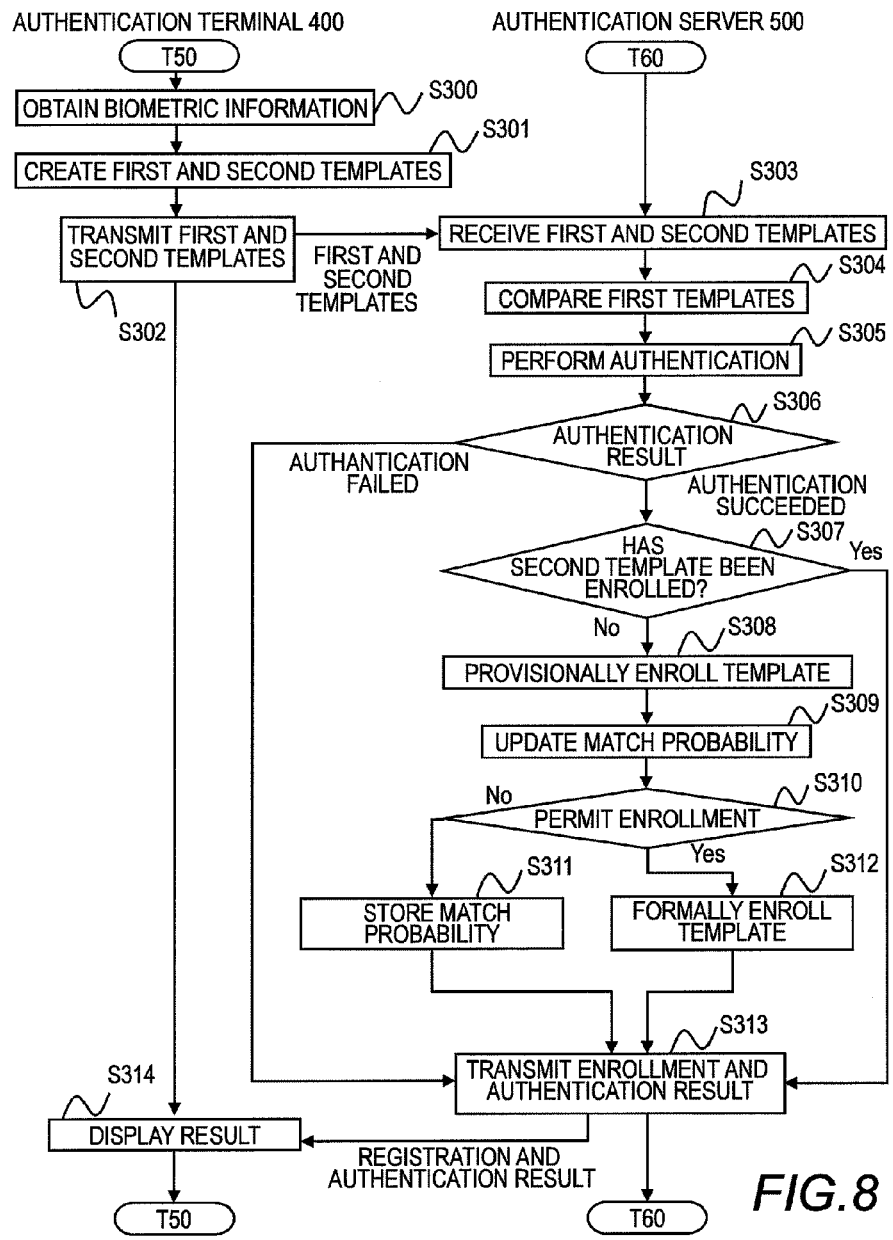
FIG. 8 is a flowchart exemplifying a procedure of automatic enrollment of a second template in the first embodiment.
Figure 9:
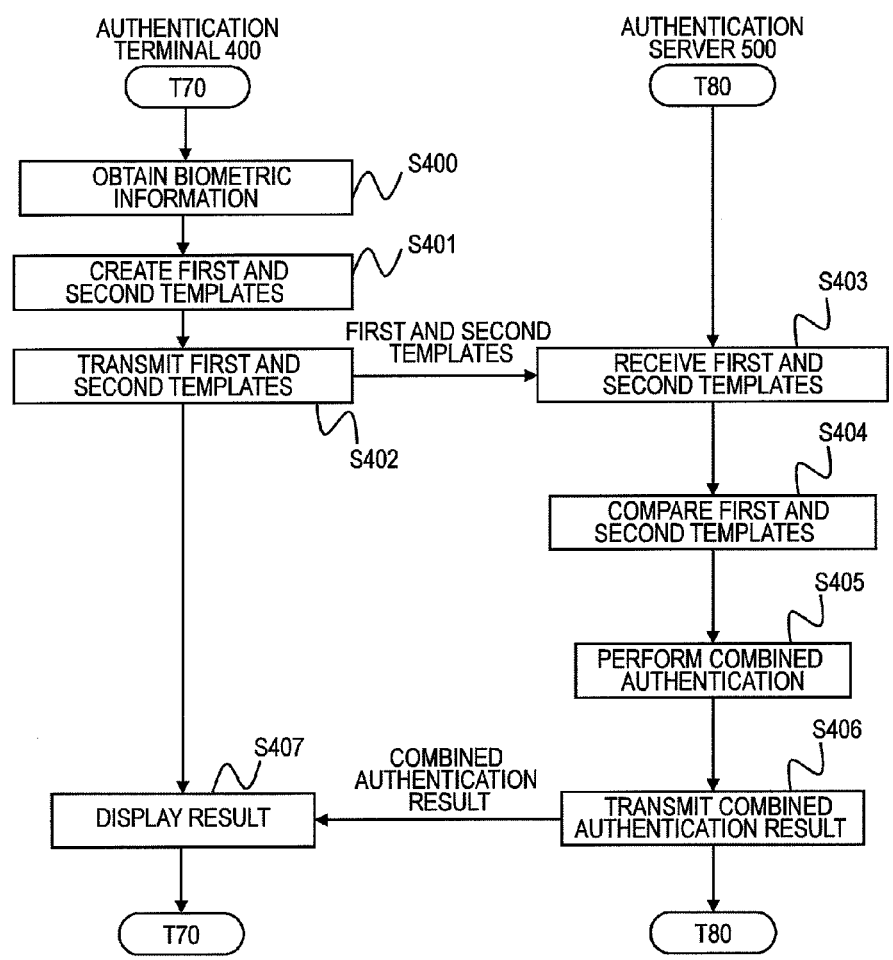
FIG. 9 is a flowchart exemplifying a procedure of multimodal authentication in the first embodiment.

FIG. 6 to FIG. 9 are flowcharts illustrating procedures of enrollment and authentication in a biometric authentication system. FIG. 6 and FIG. 7 illustrate procedures in the pre-migration biometric authentication system shown in FIG. 1, and FIG. 8 and FIG. 9 illustrate procedures in the post-migration biometric authentication system shown in FIG. 2.

FIG. 6 is a flowchart illustrating a procedure of enrolling a first template in the first embodiment. Specifically, FIG. 6 illustrates a procedure of enrolling a first template in the pre-migration biometric authentication system shown in FIG. 1.

The biometric information input module 310 in the enroll terminal 300 obtains first biometric information from a user (S100). Next, the template creator module 320 in the enroll terminal 300 creates a first template to be used by the first-template comparator module 211 in the pre-migration authentication server 200 from the first biometric information (S101). The enroll terminal 300 transmits information for identifying the user and the first template to the pre-migration authentication server 200 to request template enrollment to the pre-migration authentication server 200 (S102). When the enroll terminal 300 has received the result of the template enrollment in the pre-migration authentication server 200, the enrollment result display module 330 in the enroll terminal 300 shows the result of the template enrollment to the user (S106).

On the other side, the pre-migration authentication server 200 receives the information for identifying the user and the first template transmitted at the transmitting the first template S102 (S103). The template enroll module 230 in the pre-migration authentication server 200 enrolls the user ID created on the basis of the received information for identifying the user and the first template in the template storage 260 (S104). Hereinafter, the first template enrolled in the template storage 260 will be referred to as an enrolled first template. In addition, the pre-migration authentication server 200 transmits the enrollment result to be shown to the user by the enrollment result display module 330 (for example, information indicating whether the enrollment is successful or not) to the enroll terminal 300 (S105). The enrollment process from S103 to S105 is repeated so that first templates of a plurality of users are enrolled in the template storage 260 in the pre-migration authentication server 200. After the enrollment of users' first templates has been completed, biometric authentication in accordance with the authentication procedure shown in FIG. 7 becomes available for users.

FIG. 7 is a flowchart illustrating a procedure of unimodal authentication in the first embodiment. Specifically, FIG. 7 illustrates a procedure for a user to perform authentication using the pre-migration biometric authentication system shown in FIG. 1 after the above-described enrollment of first templates.

First, the biometric information input module 110 in the pre-migration authentication terminal 100 obtains first biometric information from a user (S200). The template creator module 120 in the pre-migration authentication terminal 100 creates a first template from the obtained first biometric information (S201). The pre-migration authentication terminal 100 transmits the obtained first template to the pre-migration authentication server 200 (S202). When the pre-migration authentication terminal 100 has received the authentication result from the pre-migration authentication server 200, the authentication result display module 130 in the pre-migration authentication terminal 100 shows the result of the authentication to the user (S207).

On the other side, the pre-migration authentication server 200 first receives the first template from the pre-migration authentication terminal 100 (S203). Hereinafter, the first template received from the pre-migration authentication terminal 100 will be referred to as an input first template. The template comparator module 210 in the pre-migration authentication server 200 compares the input first template and the enrolled first template stored in the template storage 260 to obtain the similarity between them (S204). The template comparator module 210 performs authentication on the basis of the similarity between the templates to determine whether or not the user is the person identical to the enrollee who has preliminarily enrolled the template (S205). For example, it may be determined that the user is identical to the enrollee if the similarity exceeds a predetermined threshold value. Next, the pre-migration authentication server 200 transmits the authentication result to the pre-migration authentication terminal 100 (S206). This authentication result includes at least information indicating whether or not the authentication is successful (namely, it has been determined that the user is identical to the enrollee who had preliminarily enrolled the template). Through these steps, the biometric authentication using first templates is performed.

To migrate from the biometric authentication system using first templates shown in FIG. 7 to a biometric authentication system using the first templates and second templates together, it is necessary to newly enroll the second templates. In this embodiment, the configuration of the biometric authentication system shown in FIG. 1 is changed into the configuration of the biometric authentication system shown in FIG. 2, and the biometric authentication procedure illustrated in FIG. 7 is changed into the biometric authentication procedure illustrated in FIG. 8 with migration of the biometric authentication system. With the migration, the data stored in the template storage 260 in FIG. 1 are moved to the template storage 570 in FIG. 2.

FIG. 8 is a flowchart illustrating a procedure of automatic enrollment of a second template in the first embodiment. Specifically, FIG. 8 illustrates a procedure of automatically enrolling a second template by repeating a user's authentication operation using first templates in the biometric authentication system shown in FIG. 2, where enrolled first templates have already been enrolled.

To migrate from the biometric authentication system using first templates to the biometric authentication system using the first templates and second templates together, the biometric authentication system shown in FIG. 1 is replaced with the biometric authentication system shown in FIG. 2. Namely, the pre-migration authentication terminal 100 is replaced with the post-migration authentication terminal 400; the pre-migration authentication server 200 is replaced with the post-migration authentication server 500; and the enroll terminal 300 becomes unnecessary. After the replacement of the devices, the authentication procedure T50 in the authentication terminal and the authentication procedure T60 in the authentication server are started.

First, the biometric information input module 410 in the post-migration authentication terminal 400 obtains first biometric information and second biometric information from a user (S300). The template creator module 420 in the post-migration authentication terminal 400 creates an input first template and an input second template from the first biometric information and the second biometric information, respectively (S301), and transmits them to the post-migration authentication server 500 (S302). When the post-migration authentication terminal 400 receives an enrollment and authentication result from the post-migration authentication server 500, the enrollment-and-authentication result display module 430 in the post-migration authentication terminal 400 shows the enrollment and authentication result to the user (S314).

On the other side, the post-migration authentication server 500 first receives the first template and the second template from the post-migration authentication terminal 400 (S303). Hereinafter, the first template received from the post-migration authentication terminal 400 will be referred to as an input first template; and the second template, an input second template. The first-template comparator module 511 in the post-migration authentication server 500 compares the obtained input first template with the enrolled first template preliminarily enrolled in the template storage 570 and obtains the similarity between them (S304). An authentication process on the basis of the obtained similarity (S305) provides a determination whether the user is the person identical to the enrollee who has preliminarily enrolled the enrolled first template 573 (S306). For example, it may be determined that the user is the person identical to the enrollee if the similarity exceeds the predetermined threshold value.

If the authentication is failed (namely, it is determined that the user is not the person identical to the enrollee), the post-migration authentication server 500 transmits data indicating the failed authentication to the post-migration authentication terminal 400 as the authentication result (S313) and terminates the authentication process. If the authentication is successful (namely, it is determined that the user is the person identical to the enrollee), the post-migration authentication server 500 determines whether or not there is an enrolled second template 574 related to the user in the template storage 570 (S307).

If it is determined that there is an enrolled second template 574, the post-migration authentication server 500 does not perform template enrollment and transmits data indicating the successful authentication to the post-migration authentication terminal 400 as the authentication result (S313) and terminates the authentication process. If it is determined that there is not an enrolled second template 574 (S307), the second template enrollment process following to S308 is performed.

In the second template enrollment process, first of all, the provisional template enroll module 540 enters the authentication number, the input first template, and the input second template of the user into the data comprised of the authentication numbers 583, the provisionally enrolled first templates 584, and the provisionally enrolled second templates 585, respectively, and stores the data into the provisionally enrolled template storage 580 (S308).

The match probability calculator module 520 updates the match probability on the basis of the comparison result between the provisionally enrolled first template 584 and the enrolled first template 573, and/or the comparison result between the provisionally enrolled second templates 585, and the match probability 593 stored in the match probability storage 590, and stores the updated match probability to the match probability 593 (S309). In this description, the match probability is the probability that the provisionally enrolled first template 584 is the feature value of the user's biometric information verified at S306. The method of updating the match probability at S309 will be described later.

Next, the template enrollment permitter module 560 determines whether or not to permit the enrollment of the second template (S310). Specifically, the template enrollment permitter module 560 determines whether the match probability 593 exceeds a predetermined enrollment threshold value or not.

If the match probability 593 does not exceed the predetermined enrollment threshold value, the second template is not permitted to be enrolled. In such a case, the match probability enroll module 550 stores the match probability updated at S309 to the match probability 593 in the match probability storage 590 (S311). The post-migration authentication server 500 further transmits the data indicating the success or failure of the enrollment and the success of the authentication to the post-migration authentication terminal 400 as the enrollment and authentication result (S313) to terminate the authentication process.

On the other hand, if the match probability 593 exceeds the predetermined enrollment threshold value, the second template is permitted to be enrolled at S310. In such a case, the template enroll module 530 selects a representative template from a plurality of provisionally enrolled second templates 585, enrolls it as the enrolled second template 574 (S312), and further transmits the enrollment and authentication result to the post-migration authentication terminal 400 (S313) to terminate the authentication process.

The representative template may be selected on the basis of the mutual similarity between a plurality of provisionally enrolled second templates 585. For example, with respect to each provisionally enrolled second template 585, the statistic of the similarity between the provisionally enrolled second template 585 and other provisionally enrolled second templates 585 is calculated; and then, the provisionally enrolled second template 585 with the minimum (or the maximum) statistic may be selected as the representative template. In this description, the statistic is, for example, the mean value or the like.

During the transition period, the process in FIG. 8 is repetitively performed. For example, if the biometric authentication system of this embodiment is applied to the management for entering and leaving a room, the process in FIG. 8 is performed every time any user enters the room during the transition period. As a result, a plurality pairs of provisionally enrolled first templates 584 and provisionally enrolled second templates 585 are stored for every user. Repeating the process from S303 to S313 a plurality of times leads to updating the match probability, allowing identify validation with higher accuracy. Enrolling a second template on the basis of this match probability reduces the risk of erroneously enrolling any other person's second template to provide more reliable automatic enrollment of the second template.

In this regard, a single operation of the authentication process at S305 might lead to an erroneous authentication result. In other words, there is a possibility that a template created from the biometric information of a different user may have slipped into the plurality of provisionally enrolled second templates 585 for some user. Selecting a representative template and storing it as the enrolled second template 574 as in the above description can reduce the risk of erroneous enrollment of any other user's template.

Furthermore, if the enrollment of the second template is permitted at S310, a representative template may be selected from a plurality of provisionally enrolled first templates 584 for enrollment in the enrolled first template 573 at S312 together with the enrollment of the second template.

At S309, the match probability is updated by applying Bayes' theorem to the similarity between the currently obtained input first template and the enrolled first template in addition to preliminarily obtaining the genuine distribution and imposter distribution within which the similarity between templates falls.

In this description, the distribution of the similarity obtained from templates of the identical person (namely, the distribution of the similarity between templates obtained from one user) is referred to as the genuine distribution and the distribution of the similarity obtained from templates of different persons (namely, the distribution of the similarity between templates obtained from different persons) is referred to as the imposter distribution.

Hereinbelow, the update process of the match probability will be described in detail. First, the match probability calculator module 520 obtains the similarity between learning templates from the learning templates which have preliminarily been obtained a plurality of times each from a plurality of users. Next, the match probability calculator module 520 assumes that both of the similarity between the genuine templates and the similarity between the imposter templates follow the Gaussian distribution and obtains the genuine distribution and imposter distribution by estimating distribution parameters in accordance with the MAP estimate, for example.

Next, the match probability calculator module 520 obtains the value in the genuine distribution and the value in the other persons' distribution corresponding to the similarity calculated at S304, and calculates the likelihood indicating the likelihood of the event that the input first template and the enrolled first template have been obtained from the identical person from the values in those distributions. The match probability calculator module 520 applies Bayes' theorem to the likelihood and the match probability 593 stored in the match probability storage 590 before authentication is performed (prior probability) to calculate the match probability. If no value has been stored in the match probability 593, a predetermined value is used as the prior probability.

Finally, the match probability enroll module 550 stores the obtained match probability to the match probability 593 to terminate the update of the match probability.

Figure 11:
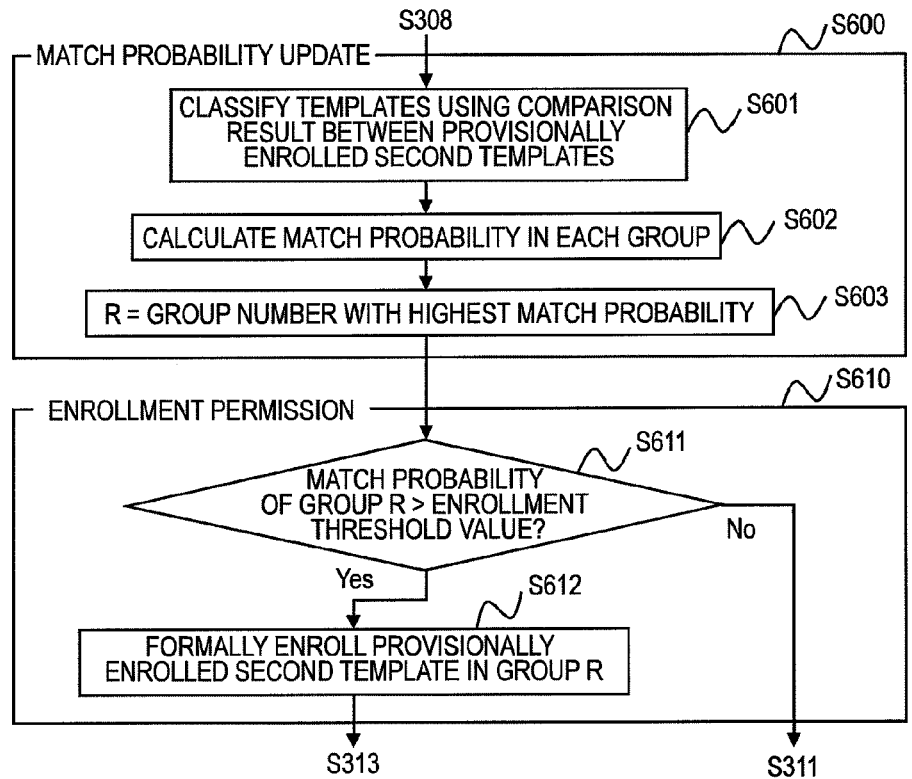
FIG. 11 is a flowchart exemplifying a procedure of enrollment of a second template based on the classification of templates in the first embodiment.

The calculating the match probability at S309 and the enrolling a second template following to S310 may be replaced with S600 and S610 in FIG. 11, respectively. Hereinbelow, those processes will be explained with reference to the drawing.

FIG. 11 is a flowchart illustrating a procedure of enrolling a second template on the basis of classification of templates in the first embodiment.

In the procedure of the second template enrollment shown in FIG. 8, the match probability is calculated for every provisionally enrolled template at S309; however, the provisionally enrolled templates may be classified into groups for calculation of the match probability in each of the groups. If each group consists of sufficiently similar provisionally enrolled second templates only, the probability that each group includes templates obtained from a plurality of persons will be lowered. Thereby, the reliability on the match probability obtained from a group increases so that a user's second template can be enrolled with higher accuracy.

At the match probability update (S600), the match probability calculator module 520 first compares the plurality of provisionally enrolled second templates stored in the provisionally enrolled second template 585 in a specific provisional user enrollment data. For example, the match probability calculator module 520 compares the value in the provisionally enrolled second template 585 related to the value "1st" in the authentication number 583 with the value in the provisionally enrolled second template 585 related to the value "2nd" in the authentication number 583 to calculate the similarity between those provisionally enrolled second templates. The match probability calculator module 520 classifies provisionally enrolled second templates using any known classifying method (for example, the complete linkage method) based on this similarity so that similar provisionally enrolled second templates will belong to the same group (S601). In a classifying method like the complete linkage method, a parameter for determining how similar items are classified to the same group is used. This parameter is determined on the basis of the preliminarily obtained imposter distribution so that the probability that templates of different users are classified into the same group will be sufficiently low. Moreover, the match probability calculator module 520 calculates the match probability for each group using the provisionally enrolled second templates belonging to the group but not using the provisionally enrolled second templates belonging to the other groups (S602) and finds the group with the highest match probability (hereinafter, referred to as a target group) (S603).

Comparing a plurality of provisionally enrolled second templates and making groups that each consist of sufficiently similar provisionally enrolled second templates allow the templates obtained from different users to be classified into different groups with high probability. If the provisionally enrolled first templates are compared with the enrolled first template group by group to calculate a match probability, the reliability on the match probability will improve because of low probability that each group includes provisionally enrolled first templates obtained from a plurality of persons.

At the enrollment permission (S610), the template enrollment permitter module 560 first compares the match probability of the target group obtained at S603 with a predetermined threshold value (S611). If the match probability exceeds the predetermined enrollment threshold value, the template enroll module selects a representative template from the provisionally enrolled second templates belonging to the target group by a predetermined means, stores the representative template in the enrolled second template 574 as the enrolled second template (S612), and proceeds to S313 in FIG. 8. On the other hand, if the match probability is lower than the enrollment threshold value, the template enroll module does not enroll a second template and proceeds to S311 in FIG. 8. Classifying templates obtained from different users into different groups by the procedure in FIG. 11 suppresses reduction in the reliability on the match probability and allows the user's second template to be enrolled with high accuracy.

After the enrolled second templates 574 have been enrolled for all users through the procedure shown in FIG. 8 and the transition period from the unimodal authentication system into the multimodal authentication system has passed, the multimodal authentication using the first templates and the second templates together shown in FIG. 9 becomes available.

FIG. 9 is a flowchart illustrating a procedure of multimodal authentication in the first embodiment. Specifically, FIG. 9 illustrates a procedure for a user to perform authentication using first templates and second templates in the post-migration biometric authentication system shown in FIG. 2.

First, in the post-migration authentication terminal 400, the biometric information input module 410 obtains a user's first biometric information and second biometric information (S400). The template creator module 420 creates a first template and a second template from the obtained first biometric information and the second biometric information, respectively (S401). The post-migration authentication terminal 400 transmits the created first template and the second template to the post-migration authentication server 500 (S402). When the post-migration authentication terminal 400 has received the authentication result from the post-migration authentication server 500, the enrollment-and-authentication result display module 430 shows the result of the authentication to the user (S407).

On the other side, the post-migration authentication server 500 first receives the input first template and the input second template from the post-migration authentication terminal 400 (S403). The template comparator module 510 compares the input first template and the input second template with the enrolled first template and the enrolled second template, respectively, which have been preliminarily enrolled (S404). The template comparator module 510 performs a combined authentication process that uses the comparison result of the first templates and the comparison result of the second templates together to determine whether or not the user is the person identical to the enrollee who has preliminarily enrolled the templates (S405). The post-migration authentication server 500 transmits the combined authentication result obtained in this way to the post-migration authentication terminal 400 (S406) to terminate the authentication process.

The combined authentication process (S405) is performed in the same way as the traditional multimodal authentication. Namely, the post-migration authentication server 500 obtains the respective authentication results from the similarity obtained as a comparison result of the first templates and the similarity obtained as a comparison result of the second templates and determines whether or not the user is the person identical to the enrollee on the basis of the obtained authentication results. Alternatively, the post-migration authentication server 500 may integrate the comparison results of the first templates and the second templates to obtain a single authentication result, and determines whether or not the user is the person identical to the enrollee.

In the above-described embodiment, a transition period is provided. During the transition period, the unimodal authentication system shown in FIG. 8 is used; after the transition period has passed, the multimodal authentication shown in FIG. 9 is started. However, in a modification example of this embodiment, the transition period may not be provided. If no transition period is provided, the procedure illustrated in FIG. 10 is used instead of the procedures illustrated in FIG. 8 and FIG. 9.

Figure 10:
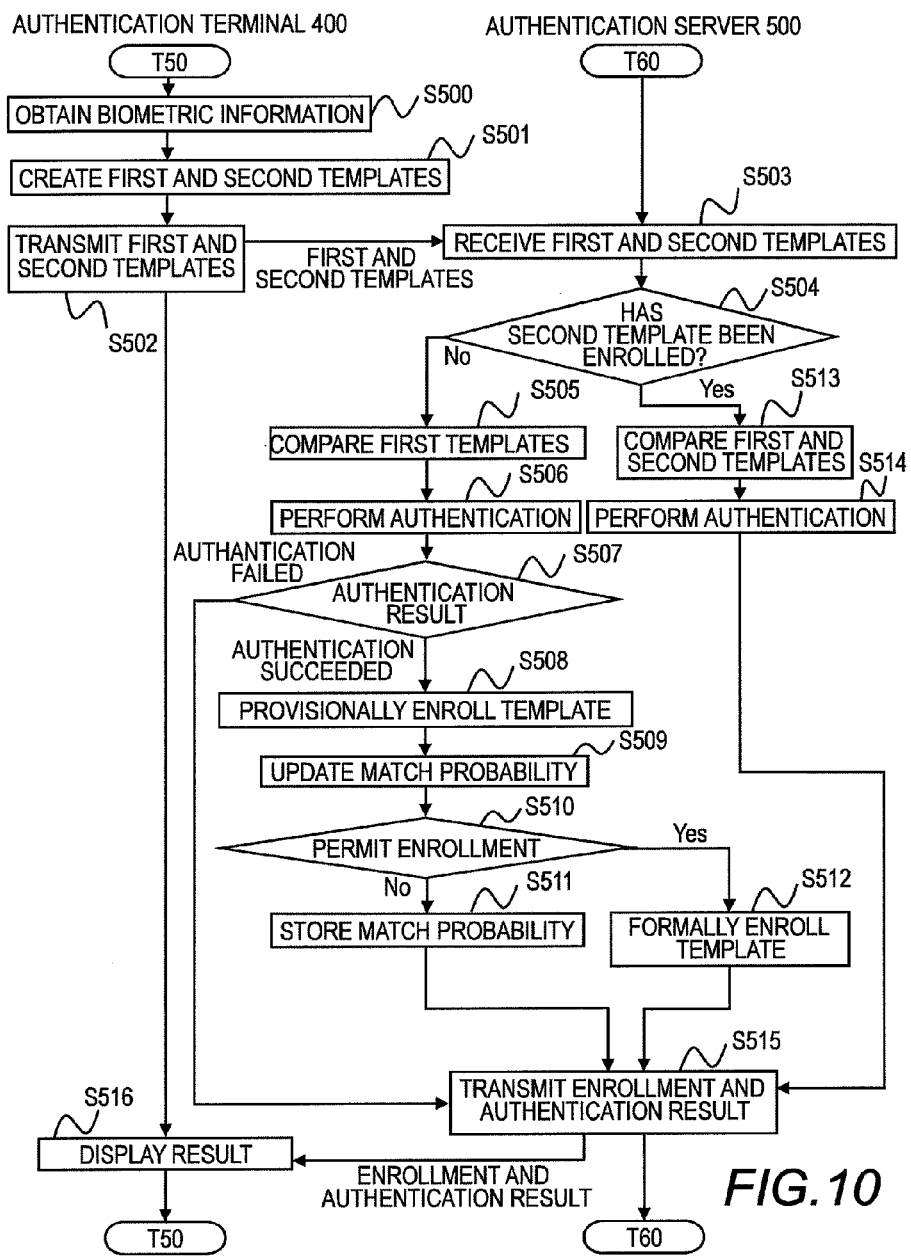
FIG. 10 is a flowchart exemplifying a procedure of enrollment of a second template and multimodal authentication without a transition period provided in the first embodiment.

FIG. 10 is a flowchart illustrating a procedure of enrollment of a second template and multimodal authentication without a transition period provided in the first embodiment.

In the second template enrollment procedure in FIG. 10, upon enrollment of the enrolled second template 574, authentication using the enrolled first template 573 and the enrolled second template 574 is started without a transition period provided. Hereinafter, the procedure will be described with reference to the drawing.

In the procedure shown in FIG. 10, S500, S501, S502, and S516 executed by the post-migration authentication terminal 400 are the same as S300, S301, S302, and S314 in FIG. 8, respectively.

After receipt of an input first template and an input second template from the post-migration authentication terminal 400 (S503), the post-migration authentication server 500 determines whether there is an enrolled second template 574 or not (S504). If there is an enrolled second template 574, the first-template comparator module 511 compares the input first template with the enrolled first template 573 and the second-template comparator module 512 compares the input second template with the enrolled second template 574 to calculate their similarities (S513). The template comparator module 510 performs the same authentication process as the one at S405 in FIG. 9 on the basis of the obtained similarity of the first templates and the similarity of the second templates (S514), and transmits the authentication result to the post-migration authentication terminal 400 (S515).

On the other hand, if there is not a enrolled second template 574 at S504, the first-template comparator module 511 compares the input first template with the enrolled first template 573 to calculate the similarity (S505), and performs the same authentication process as the one at S305 in FIG. 8 (S506). If the authentication is successful, the procedure starts the second template enrollment process like in FIG. 8, followed by provisional enrollment of the template (S508), update of the match probability (S509), and enrollment permission (S510). If the enrollment is permitted, the template is enrolled (S512); if it is not permitted, the match probability is stored (S511) and the template enrollment will be made at the next or the subsequent authentication. Since S508 to S512 are the same as S308 to S312 in FIG. 8, respectively, detailed explanation will be omitted.

Through the above-described procedure, if a second template is automatically enrolled, multimodal authentication using first templates and second templates will be available for the user in the next and the subsequent authentication operations. Accordingly, the transition period does not need to be provided; the second template enrollment and authentication using multiple kinds of templates become concurrently available.

Figure 12:
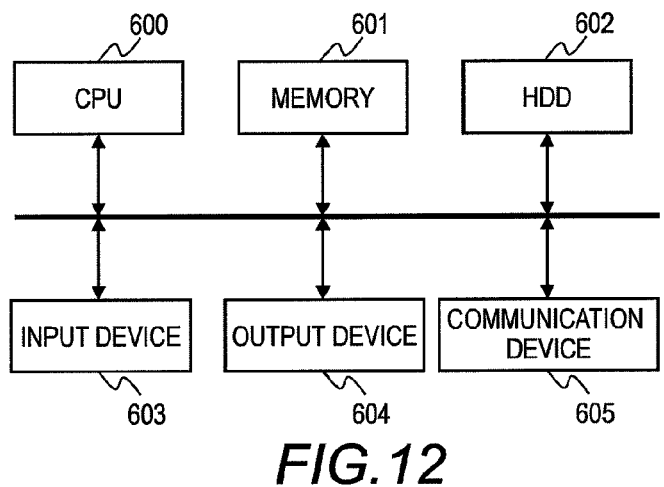
FIG. 12 is a block diagram exemplifying a hardware configuration of the biometric authentication system in the first embodiment.

FIG. 12 is a block diagram illustrating a hardware configuration of the biometric authentication system according to the first embodiment.

Specifically, FIG. 12 illustrates a hardware configuration of the pre-migration authentication terminal 100, the pre-migration authentication server 200, the enroll terminal 300, the post-migration authentication terminal 400, and the post-migration authentication server 500 in this embodiment. These may each comprise a CPU (Central Processing Unit) 600, a memory 601, an HDD (Hard Disk Drive) 602, an input device 603, an output device 604, and a communication device 605.

In the memory 601 in the pre-migration authentication terminal 100, a program corresponding to the template creator module 120 is stored. The CPU 600 in the pre-migration authentication terminal executes the program to provide the template creator module 120. In the memory 601 in the pre-migration authentication server 200, programs corresponding to the template comparator module 210 and the template enroll module 230 are stored. The CPU 600 in the pre-migration authentication server executes these programs to provide the template comparator module 210 and the template enroll module 230.

In the memory 601 in the enroll terminal 300, a program corresponding to the template creator module 320 is stored. The CPU 600 in the enroll terminal 300 executes this program to provide the template creator module 320. In the memory 601 in the post-migration authentication terminal 400, a program corresponding to the template creator module 420 is stored. The CPU 600 in the post-migration authentication terminal 400 executes this program to provide the template creator module 420.

In the memory 601 in the post-migration authentication server 500, programs corresponding to the template comparator module 510, the match probability calculator module 520, the template enroll module 530, the provisional template enroll module 540, the match probability enroll module 550, and the template enrollment permitter module 560 are stored. The CPU 600 in the post-migration authentication server 500 executes these programs to provide the template comparator module 510, the match probability calculator module 520, the template enroll module 530, the provisional template enroll module 540, the match probability enroll module 550, and the template enrollment permitter module 560.

In the HDD 602 in the pre-migration authentication server, the template storage 260 is stored, and in the HDD 602 in the post-migration authentication server 500, the template storage 570, the provisionally enrolled template storage 580, and the match probability storage 590 are stored.

The input device 603 in the pre-migration authentication terminal 100 corresponds to the biometric information input module 110. The input device 603 of the enroll terminal 300 corresponds to the biometric information input module 310. The input device 603 in the post-migration authentication terminal 400 corresponds to the biometric information input module 410. For example, if the first biometric information is fingerprints, the input devices 603 in the pre-migration authentication terminal 100 and the enroll terminal 300 are fingerprint readers. For example, if the first biometric information is fingerprints and the second biometric information is finger vein patterns, the input device 603 in the post-migration authentication terminal 400 is a reader for fingerprints and finger vein patterns.

The input device 603 in the post-migration authentication terminal 400 is preferably a single device which can simultaneously read two kinds of biometric information (for example, fingerprints and finger vein patterns). However, as far as the two kinds of biometric information of one user are managed so as to be definitely associated for input, the input device 603 in the post-migration authentication terminal 400 may be two devices that read one kind of biometric information individually.

If a user inputs his or her identification information (for example, an ID number) in addition to his or her biometric information, the input device may further include a keyboard, for example.

The output device 604 in the pre-migration authentication terminal 100 corresponds to the authentication result display module 130. The output device 604 in the enroll terminal 300 corresponds to the enrollment result display module 330. The output device 604 in the post-migration authentication terminal 400 corresponds to the enrollment-and-authentication result display module 430. These may be display monitors for displaying texts or given images, for example.

The communication device 605 is used for communication between hardware devices. For example, transmitting and receiving information at S102, S103, and S105 in FIG. 6 are performed through the communication devices 605 in the authentication terminal and the authentication server. The same can be said to the transmissions and the receptions shown in the other flowcharts.

According to the first embodiment described above, when additional templates are required to be enrolled to migrate from a unimodal authentication system into a multimodal authentication system, users can automatically enroll a new kind of additional templates by repeating usual biometric authentication. This provides a highly convenient biometric authentication system. Moreover, since whether or not to enroll a template is determined depending on the match probability, which is calculated from multiple authentication results, the identity can be validated with high accuracy. Therefore, the risk of erroneously enrolling any other person's template can be reduced.

Second Embodiment

A second embodiment is a system that automatically enrolls second templates when migrating from a biometric authentication system which performs authentication using first templates into a biometric authentication system which performs authentication using the first templates and second templates together. Compared to the first embodiment in which first biometric information and second biometric information are obtained from a user to create a first template and a second template, respectively, in this embodiment, two kinds of templates, that is, a first template and a second template, are created from the first biometric information. These two kinds of templates are created in accordance with algorithms different from each other, for example. For example, assume that, while a first algorithm is being used to create first templates, a new second algorithm allowing more accurate authentication have been developed. To introduce the second algorithm into biometric authentication, the second embodiment is applicable.

In this embodiment, initially, the first template enrollment illustrated in FIG. 6 and the biometric authentication illustrated in FIG. 7 are performed in a pre-migration biometric authentication system shown in FIG. 1 that performs authentication using first templates. To migrate from the pre-migration biometric authentication system into a post-migration biometric authentication system that performs authentication using first templates and second templates together, a transition period in which users are allowed to enroll second templates is provided. During the transition period, the automatic enrollment of second templates and the authentication using first templates illustrated in FIG. 8 are performed. After the transition period has passed, the authentication process illustrated in FIG. 1 is performed using first templates and second templates together.

Hereinbelow, the second embodiment will be described in detail with reference to the drawings. In this embodiment, although the same drawings will be referred to as those in the first embodiment, a part of the procedures differ from those in the first embodiment.

FIG. 1 is a diagram illustrating a pre-migration biometric authentication system in this embodiment. The system configuration is the same as in the first embodiment.

FIG. 2 is a diagram illustrating a post-migration biometric authentication system in this embodiment. Compared to the biometric information input module 410 in the first embodiment that obtains two kinds of biometric information, the biometric information input module 410 in this embodiment obtains a single kind of biometric information (or the first biometric information) like the biometric information input module 110 in FIG. 1. In this embodiment, since a first template and a second template are created from a single kind of first biometric information and they are used in the authentication process, the inputs to the first template creator module 421 and the second template creator module 422 are the same first biometric information. For example, the first template creator module 421 creates a first template from the first biometric information using a first template creation algorithm and the second template creator module 422 creates a second template from the first biometric information using a second template creation algorithm.

The configuration except for the biometric information input module 410, the first template creator module 421, and the second template creator module 422 is the same as the one in the first embodiment.

FIG. 3 to FIG. 7 are diagrams illustrating the internal configuration of the template storage, the internal configuration of the provisional enrolled template storage, the internal configuration of the match probability storage, the procedure of template enrollment to the pre-migration biometric authentication system and the procedure of authentication process in the pre-migration biometric authentication system. The internal configurations and the procedures shown in FIG. 3 to FIG. 7 are the same as the ones in the first embodiment.

FIG. 8 is a diagram illustrating the procedure of enrolling a second template in the post-migration biometric authentication system. In this embodiment, a single kind of first biometric information is obtained at S300. At S301, the first biometric information is input to the first template creator module 421 and the second template creator module 422 to create a first template and a second template. The processes except for those at S300 and S301 are the same as the processes in the first embodiment.

After enrolled second templates 574 have been enrolled for all users through the procedure shown in FIG. 8 and the transition period of the biometric authentication system has passed, the biometric authentication system shown in FIG. 9 using first templates and second templates together becomes available.

FIG. 9 is a diagram illustrating an authentication procedure in the post-migration biometric authentication system. In the authentication procedure of this embodiment, the obtaining biometric information (S400) and the creating first and second templates (S401) differ from those in the first embodiment, but other processes are the same as those in the first embodiment. In the first embodiment, two different kinds of biometric information of the first biometric information and the second biometric information are obtained at S400. In contrast, in this embodiment, since a single kind of biometric information is used after the migration the first biometric information is obtained but the second biometric information is not obtained at S400. At S401, the first template creator module 421 and the second template creator module 422 create a first template and a second template, respectively, from the first biometric information.

In this embodiment, after enrolled second templates 574 are enrolled through the procedure shown in FIG. 8, migration into a unimodal biometric authentication system using second templates may be available instead of migration into a multimodal biometric authentication system. To achieve such migration, the system configuration is changed from the configuration shown in FIG. 2 to the configuration shown in FIG. 1, and the enrolled second templates 574 enrolled by the procedure of FIG. 8 are stored in the template storage 260 in FIG. 1. Thereafter, authentication is performed in accordance with the authentication procedure shown in FIG. 7, using second templates instead of first templates.

According to the above-described embodiment, if additional enrollment of a template becomes necessary as a template creation algorithm has been added, a user merely repeats a usual biometric authentication operation to add the template automatically. Moreover, the match probability is calculated from a plurality of authentication results to determine whether or not to enroll the template on the basis of the match probability. Thereby, the risk of erroneously enrolling any other person's template can be reduced.

Third Embodiment

In a third embodiment, after automatic enrollment of the enrolled second template shown in FIG. 8, the system accepts an input based on the identity validation by an operator and then starts authentication using the automatically enrolled second template 574. In this embodiment, first, the enrolled second template is automatically enrolled in accordance with the procedure in FIG. 8; thereafter, an operator validates the identity of the user. After this validation is completed and the operator performs a biometric authentication system migration operation, the post-migration biometric authentication shown in FIG. 9 becomes available for the user.

For example, after the enrolled second template 574 is enrolled in accordance with the procedure in FIG. 8, the post-migration authentication server 500 may perform a determination process (not shown) to determine whether or not an operator has input a validation result of the user. The operator may actually meet the user to validate that the user is the exact person to be enrolled on the basis of a document for identifying the user, for example. Thereafter, the operator inputs information indicating that the identity validation has succeeded with the input device 603 of the post-migration authentication server 500. The post-migration authentication server 500 starts the multimodal authentication shown in FIG. 9 if this information has been input.

In this embodiment, like in the second embodiment, migration into a unimodal biometric authentication using automatically enrolled second template can be achieved by changing from the system configuration shown in FIG. 2 into the system configuration shown in FIG. 1 and storing the enrolled second templates 574 to the template storage 260 in FIG. 1.

What is claimed is:

1. A biometric authentication system comprising:
an input device for obtaining users' biometric information;
a processor coupled to the input device; and
a storage device for storing data,
wherein:
  the storage device is arranged to store, for each of a plurality of enrollment applicants, a respective first feature value based on biometric information obtained from the enrollment applicant as a first enrolled template of the enrollment applicant together with identification information on the enrollment applicant;
  the input device is arranged to obtain biometric information from a user of the biometric authentication system to authenticate the user;
  the processor is arranged to calculate, each time the input device obtains biometric information, the first feature value based on the obtained biometric information as a first template and a second feature value based on the obtained biometric information as a second template;
  the processor is arranged to determine whether authentication of the user is successful or not on the basis of the similarity between the first template and the first enrolled template stored in the storage device;
  the processor is arranged to transmit, if the authentication is failed, a notice of failed authentication to the input device to show the notice to the user;
  the processor is arranged to provisionally enroll, if the authentication is successful, the first template and the second template in the storage device while relating the first template and the second template to identification information on the user which is identification information on an applicant for enrollment held in the storage device together with the first enrolled template identified as the first enrolled template of the user on the basis of the similarity in a plurality of first enrolled templates held in the storage device;

the processor is arranged to calculate, based on a plurality of first templates provisionally enrolled in the storage device in relation to the identification information on the user, a match probability indicating the probability that the plurality of first templates are the feature values of the biometric information obtained from the user;

the processor is arranged to enroll, if the match probability exceeds a predetermined threshold value, a second template selected on the basis of similarities among second templates related to the plurality of provisionally enrolled first templates as a second enrolled template of the user while relating the second template to the identification information on the user;

the processor is arranged to transmit a notice of successful authentication based on the first template and the first enrolled template to the input device to show the notice to the user; and the processor is arranged to determine, in a case where the second feature value based on the biometric information obtained by the input device is calculated as the second template after the second enrolled template is enrolled in the storage device, whether authentication of the user is successful or not on the basis of the similarity between the second template and the second enrolled template stored in the storage device.

2. The biometric authentication system according to claim 1, wherein:
the biometric information obtained by the input device from the user includes a first kind of biometric information and a second kind of biometric information;
the first feature value based on the first kind of biometric information is calculated as the first enrolled template or the first template; and
the second feature value based on the second kind of biometric information is calculated as the second template.

3. The biometric authentication system according to claim 2, wherein:
the processor is arranged to transmit a notice whether the enrollment of the second template of the user is successful or not to the input device to show the notice to the user.

4. The biometric authentication system according to claim 1, wherein:
the processor is arranged to apply two different algorithms to the biometric information to calculate the first feature value as the first enrollment template or the first template on the basis of the first algorithm and the second feature value as the second template on the basis of the second algorithm.

5. The biometric authentication system according to claim 1, wherein the processor is configured to:
preliminarily store a genuine distribution indicating the distribution of the similarity between feature values of biometric information obtained from a user and an imposter distribution indicating the distribution of the similarity between feature values of biometric information obtained from different users; and
calculate the match probability on the basis of values in the genuine distribution and values in the imposter distribution corresponding to the similarity between the enrolled first template and the plurality of first templates.

6. The biometric authentication system according to claim 1, wherein the processor is configured to:
classify the plurality of second templates related to the plurality of first templates whose similarities to the first enrolled template exceed the predetermined threshold value into a plurality of groups using a given classifying method based on the mutual similarity between the plurality of second templates;
calculate the match probability of the plurality of first templates related to the plurality of second templates included in a group for each of the groups; and
store, if the calculated match probability of a first group of the plurality of groups exceeds the predetermined threshold value, one of the plurality of second templates included in the first group as the second enrolled template.

7. The biometric authentication system according to claim 1, wherein, if the match probability exceeds the predetermined threshold value, the biometric authentication system stores one of the plurality of first templates as a new first enrolled template.

8. The biometric authentication system according to claim 1, wherein the processor is configured to:
determine, until the second enrolled template is stored, that authentication of the user is successful if the similarity between each of the first templates and the first enrolled template exceeds a predetermined threshold value; and
determine, after the second enrolled template is stored, that authentication of the user is successful if the similarity between the second template and the second enrolled template exceeds a predetermined threshold value.

9. The biometric authentication system according to claim 1, wherein the processor is configured to:
determine, until the second enrolled template is stored, that authentication of the user is successful if the similarity between the first templates and the first enrolled template exceeds a predetermined threshold value;
calculate, if the biometric authentication system obtains a pair of the first kind of biometric information and the second kind of biometric information through the input device after the second enrolled template is stored, the feature value of the first kind of biometric information as the first template and the feature value of the second kind of biometric information as the second template; and
determine whether authentication of the user is successful or not on the basis of the similarity between the first template and the first enrolled template and on the basis of the similarity between the second template and the second enrolled template.

10. The biometric authentication system according to claim 1, wherein the processor is configured to:
receive, after the second enrolled template is stored, an input of information indicating that authentication using the second enrolled template starts;
calculate, if the biometric authentication system obtains at least a second kind of biometric information through the input device after the information indicating that the authentication using the second enrolled template starts is input, the feature value of the second kind of biometric information as the second template, and
determine whether authentication of the user is successful or not on the basis of the similarity between the second template and the second enrolled template.

11. The biometric authentication system according to claim 1, wherein, if the match probability exceeds a predetermined threshold value, the processor is arranged to select a representative template from the plurality of second templates related to the plurality of first templates which are determined that the similarity to the enrolled template exceeds the predetermined threshold value on the basis of the mutual similarity between the plurality of second templates and to store the selected representative template as the second enrolled template.

* * * * *